Figure 1:
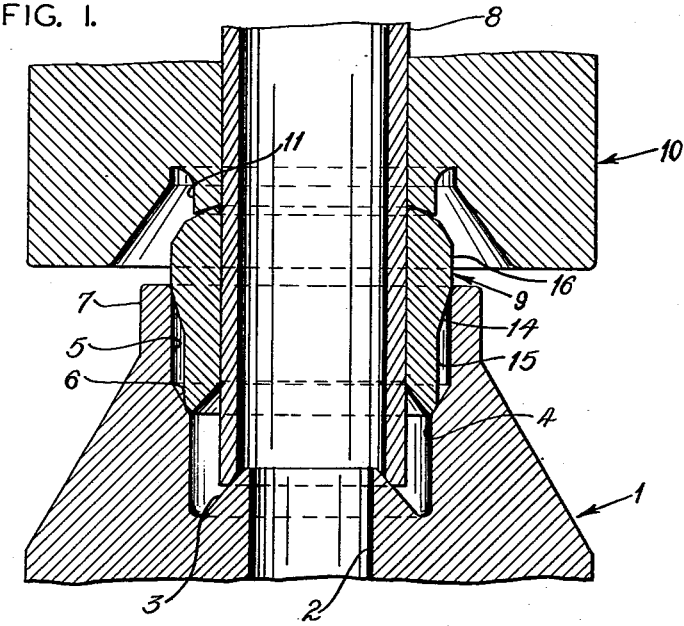

Aug. 31, 1954　　　　S. SCHNELL　　　　2,687,906

SWAGED TYPE METALLIC PIPE FITTING

Filed Jan. 26, 1949

INVENTOR:
Steve Schnell

Carr, Carr & Gravely,
HIS ATTORNEYS.

Patented Aug. 31, 1954

2,687,906

UNITED STATES PATENT OFFICE 2,687,906

SWAGED TYPE METALLIC PIPE FITTING

Steve Schnell, Kirkwood, Mo., assignor to Wagner Electric Corporation, St. Louis, Mo., a corporation of Delaware Application January 26, 1949, Serial No. 72,907

2 Claims. (Cl. 285—182.1)

This invention relates to pipe fittings and is more particularly directed to an improved solderless or weldless fitting capable of transmitting liquids under high pressures.

The invention consists of a suitably shaped piece of metal having a bore and counterbores therein in which one end of a piece of pipe is inserted, and an insert comprising a metal cylinder or sleeve that is inserted in the counterbore over the pipe, after which the pipe, sleeve, and piece of metal are worked into tight contact with each other so as to provide a fluid-tight seal between the three parts.

One of the objects of the invention is to provide a weldless fitting whose parts can be produced on an automatic screw or other type machine so that when assembled, the parts will accurately fit each other and also be easily and economically worked for providing a low cost fluid-tight joint.

Another object of the invention is to produce a pipe fitting that relies solely on the pressure between the worked parts for producing a metal-to-metal contact fluid-tight joint.

Figure 2:
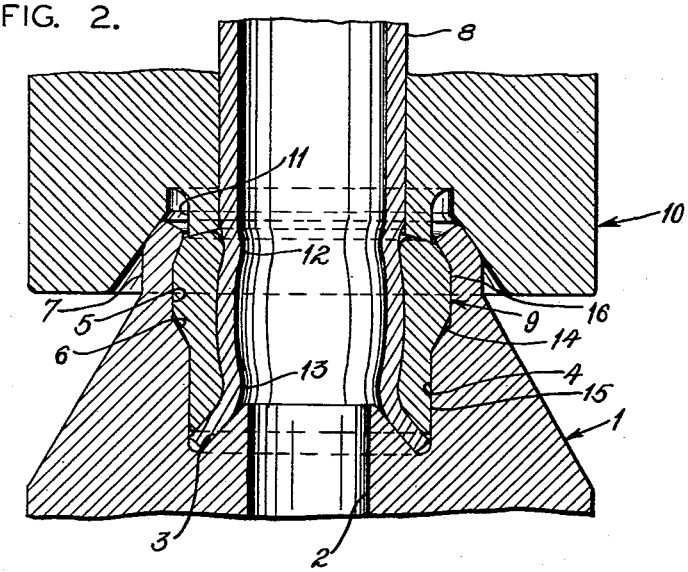

In the drawings:

Fig. 1 is a longitudinal sectional view of a joint embodying the invention with the parts in their original condition; and Fig. 2 is a view similar to Fig. 1 but with the parts after having been worked into final position.

The invention is embodied in the device illustrated in the drawings in which the numeral 1 designates the body of the fitting formed from metal suitable for swaging. The body 1 has a three-step bore therein which is provided with a conical portion 3 located between the smallest bore 2 and the intermediate bore 4, and a sloping shoulder 6 is located between the intermediate bore and the largest bore 5. As viewed in the drawings, the upper end of the body 1 is provided with an integral annular portion 7, preferably rectangular in section, that defines the mouth of the largest bore 5.

One end of a pipe or tube 8 is inserted in the bore 5 and rests on the upper end of the conical portion 3, the internal diameter of the pipe being slightly larger than the diameter of the smallest bore 2.

A sealing sleeve 9, formed from swageable material, is fitted over the pipe 8, the lower end of the sleeve engaging shoulder 6 and whose upper part 16 is in substantial alignment with the upper edge of portion 7, as shown in Fig. 1. The external diameter of the lower part 15 of the sleeve is slightly greater than that of bore 4, the upper part 16 of the sleeve having a diameter slightly greater than that of bore 5. A sloping shoulder 14 whose angle with the axis of tube 8 is less than that of shoulder 6, connects the upper part 16 with the lower part 15 of the sleeve 9. The bore diameter of the sleeve 9 is approximately equal to the external diameter of the pipe 8.

Part 10 is a swaging die, securable to a suitable press, having an integral annular ring setting sleeve 11 formed on its lower end that forms one wall of the concave end of the die. The sleeve 11 is engageable with the upper end of the sealing sleeve 9, and the annular portion 7 of the body is engaged by the concave end of die 10. The bore in die 10 is slightly larger than the external diameter of pipe 8 so that the die, during the working of the parts, laterally supports the pipe 8.

The sleeve 9 is placed around pipe 8 and both are inserted in bore 5, as shown by Figure 1, so that the lower end of pipe 8 is in contact with the conical surface of portion 3. The lower end 15 of sleeve 9 contacts shoulder 6 while the upper end 16 contacts the internal bore of annular portion 7. The die 10 is then placed over pipe 8 with the ring setting sleeve 11 in contact with the top surface of sleeve 9, thereby placing the parts in initial position for forming the fluid-tight seal.

Upon application of sufficient axial pressure to the die 10, the ring setting sleeve 11 produces an inward deformation of the upper portion 16 of the sleeve 9 and causes the upper portion of sleeve 9 to become smaller in diameter and thus form an undulation 12 in pipe 8 (Fig. 2). At the same time the lower end 15 of sleeve 9 is forced past the sloping surface of shoulder 6, thereby reducing the diameter of that part of the sleeve, causing it to engage pipe 8 adjacent thereto and forming an undulation 13 that is axially spaced from the undulation 12. Upon continued application of pressure, the die 10 moves further toward the body 1 but now, due to the undulations in the pipe and sleeve, the pipe 8 is carried along with the sleeve. The axial movement of pipe 8 causes a flare to be formed at its lower end by forcing it over the conical surface of portion 3. The movement of the die is continued until pipe 8, sleeve 9, and body 1 assume the final form and shape shown in Fig. 2 wherein the lower portion of the sleeve 9 is forced into the space between the pipe 8 and the walls of bore 4 and completely filling the upper portion of bore 4. Simultaneously, the upper end of sleeve 9 fills the space between the wall of the lower end of bore 5 and the pipe 8.

The last portion of the downward movement of the swaging die 10 along its longitudinal axis, causes the concave swaging surface on the lower end of die 10 to deform annular portion 7 and force it over the upper surface or end of the sleeve 9, thus effectively locking it in place, thereby preventing relative movement between the sleeve, body, and pipe.

After completion of the above sequence of operations, the swaging die is withdrawn, leaving the body 1 permanently interlocked with the pipe 8.

It is usually necessary to apply a fitting to each end of pipe 8 and, therefore, the swaging die 10 may be made in two parts so that both ends of pipe 8 may have the body 1 applied thereto in this manner.

The construction described obviates the necessity of special pressure sealing means in the joint between the fitting and the pipe 8 because the long metal-to-metal pressure contacts between sleeve 9 and pipe 8 and the sleeve and fitting preclude the possibility of leakage therebetween.

What I claim is:

1. A coupling comprising a coupling body provided with a passage bore, an intermediate bore, and a large bore; an inwardly deformed portion at the end of the coupling body adjacent said large bore; a conical surface between the passage bore and the intermediate bore, said conical surface forming an annular pocket with the intermediate bore; a pipe having one end disposed in the large bore and the intermediate bore in contact with the conical surface and flared outwardly into the annular pocket, the end of the pipe containing a plurality of undulations; a sleeve fitted about said pipe and having a sloping end portion contacting the flared end of the pipe and filling the space between the pipe and the intermediate bore, and an enlarged portion filling the space between the pipe and the large bore, said sleeve being unitary and having sealing engagement with the exterior of the deformed pipe portion and the interior walls of the large and intermediate bores, said deformed portion overlying at least a part of said enlarged portion.

2. A coupling comprising a coupling body provided with a passage bore, an intermediate bore, and a large bore; an inwardly deformed portion at the end of the coupling body adjacent said large bore; a conical surface between the passage bore and the intermediate bore, said conical surface forming an annular pocket with the intermediate bore; a pipe having one end disposed in the large bore and the intermediate bore in contact with the conical surface and flared outwardly into the annular pocket, the end of the pipe containing a plurality of undulations; a sleeve fitted about said pipe and having a sloping end portion contacting the flared end of the pipe and filling the space between the pipe and the intermediate bore, and an enlarged portion filling the space between the pipe and the large bore, said sleeve being unitary and having sealing engagement throughout substantially its entire interior and exterior surface areas with the exterior surface of the deformed pipe portion and the interior walls of the large and intermediate bores, respectively, said deformed portion overlying at least a part of said enlarged portion.

References Cited in the file of this patent

UNITED STATES PATENTS

| Number | Name | Date |
|---|---|---|
| 293,083 | Converse | Aug. 28, 1883 |
| 1,021,485 | Ross | Mar. 26, 1912 |
| 1,192,927 | Mosher | Aug. 1, 1916 |
| 1,901,088 | Dick | Mar. 14, 1933 |
| 2,005,267 | Rehder | June 18, 1935 |
| 2,054,362 | Cowles | Sept. 15, 1936 |
| 2,134,719 | Kocher | Nov. 1, 1938 |
| 2,195,559 | Briegel | Apr. 2, 1940 |
| 2,281,594 | Pearl | May 5, 1942 |
| 2,332,682 | Yelinek | Oct. 26, 1943 |
| 2,430,921 | Edelmann | Nov. 18, 1947 |
| 2,466,317 | Kane | Apr. 5, 1949 |
| 2,534,199 | Guarnaschelli | Dec. 12, 1950 |
| 2,544,109 | Richardson | Mar. 6, 1951 |
| 2,574,625 | Coss | Nov. 13, 1951 |